US010558775B2

(12) United States Patent
Kim et al.

(10) Patent No.: US 10,558,775 B2
(45) Date of Patent: Feb. 11, 2020

(54) MEMORY ELEMENT GRAPH-BASED PLACEMENT IN INTEGRATED CIRCUIT DESIGN

(71) Applicant: International Business Machines Corporation, Armonk, NY (US)

(72) Inventors: Myung-Chul Kim, Travis, TX (US); Arjen Alexander Mets, Sleepy Hollow, NY (US); Gi-Joon Nam, Chappaqua, NY (US); Shyam Ramji, Lagrangeville, NY (US); Lakshmi N. Reddy, Mt. Kisco, NY (US); Alexander J. Suess, Hopewell Junction, NY (US); Benjamin Trombley, Wappingers Falls, NY (US); Paul G. Villarrubia, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 82 days.

(21) Appl. No.: 15/848,556

(22) Filed: Dec. 20, 2017

(65) Prior Publication Data
US 2019/0188352 A1    Jun. 20, 2019

(51) Int. Cl.
*G06F 17/50*    (2006.01)
(52) U.S. Cl.
CPC ........ *G06F 17/505* (2013.01); *G06F 17/5031* (2013.01); *G06F 17/5068* (2013.01);
(Continued)
(58) Field of Classification Search
CPC .............. G06F 17/505; G06F 17/5072; G06F 2217/84; G06F 17/5068; G06F 17/5045;
(Continued)

(56) References Cited

U.S. PATENT DOCUMENTS 5,537,580 A * 7/1996 Giomi ................. G06F 17/5045
716/103
5,999,716 A * 12/1999 Toyonaga ........... G06F 17/5072
716/122
(Continued)

FOREIGN PATENT DOCUMENTS

WO    2008005622 A2    1/2008

OTHER PUBLICATIONS

Anonymous, "Incremental timing-driven placement to optimize the local clock network for high performance designs", IPCOM000215244D, Feb. 22, 2012, pp. 1-5.
(Continued)

*Primary Examiner* — Helen Rossoshek
(74) *Attorney, Agent, or Firm* — Cantor Colburn LLP; Erik Johnson

(57) ABSTRACT

A system and method to perform physical synthesis to transition a logic design to a physical layout of an integrated circuit include obtaining an initial netlist that indicates all components of the integrated circuit including memory elements and edges that interconnect the components. The method also includes generating a graph with at least one of the memory elements and the edges carrying one or more signals to the at least one of the memory elements or from the at least one of the memory elements. The components other than memory elements are not indicated individually on the graph. The netlist is updated based on the graph.

17 Claims, 6 Drawing Sheets

(52) U.S. Cl.
CPC ...... *G06F 17/5072* (2013.01); *G06F 17/5045* (2013.01); *G06F 2217/84* (2013.01)

(58) Field of Classification Search
CPC ............. G06F 17/5031; G06F 17/5022; G06F 2217/06
See application file for complete search history.

(56) References Cited

U.S. PATENT DOCUMENTS

| | | | |
|---|---|---|---|
| 6,292,925 B1 | 9/2001 | Dellinger et al. | |
| 6,920,625 B2 | 7/2005 | Gass | |
| 7,032,198 B2* | 4/2006 | Sano | G06F 17/505 716/104 |
| 7,490,307 B2* | 2/2009 | Fornaciari | G06F 17/5031 716/103 |
| 7,549,137 B2 | 6/2009 | Alpert et al. | |
| 7,624,366 B2 | 11/2009 | Alpert et al. | |
| 7,707,530 B2 | 4/2010 | Alpert et al. | |
| 7,895,544 B2 | 2/2011 | Amundson | |
| 7,945,880 B1* | 5/2011 | Albrecht | G06F 17/5031 716/101 |
| 8,141,019 B2 | 3/2012 | Curtin et al. | |
| 8,271,920 B2 | 9/2012 | Cho et al. | |
| 8,375,345 B1 | 2/2013 | Barowski et al. | |
| 8,381,142 B1* | 2/2013 | Hutton | G06F 17/5054 716/100 |
| 8,495,552 B1 | 7/2013 | Cho et al. | |
| 8,566,770 B2* | 10/2013 | Lilja | G06F 17/5068 326/12 |
| 8,572,539 B2* | 10/2013 | Cortadella | H03K 19/20 327/142 |
| 9,053,274 B1* | 6/2015 | van Antwerpen | G06F 17/5054 |
| 9,098,669 B1 | 8/2015 | Alpert et al. | |
| 9,275,176 B2* | 3/2016 | Chuang | G06F 17/5077 |
| 9,536,030 B2 | 1/2017 | Fricke et al. | |
| 9,576,092 B2 | 2/2017 | Platzker et al. | |
| 9,792,397 B1 | 10/2017 | Nagaraja | |
| 9,916,408 B2* | 3/2018 | Fawaz | G06F 17/5045 |
| 10,387,603 B2* | 8/2019 | Sinnadurai | |
| 2003/0105617 A1* | 6/2003 | Cadambi | G06F 17/5022 703/14 |
| 2008/0216038 A1 | 9/2008 | Bose | |
| 2012/0054699 A1 | 3/2012 | Cho et al. | |
| 2013/0326455 A1 | 12/2013 | Alpert et al. | |
| 2015/0347644 A1* | 12/2015 | Arakawa | G06F 17/505 716/105 |
| 2016/0098506 A1* | 4/2016 | Agarwal | H03K 3/0372 327/225 |
| 2016/0224709 A1* | 8/2016 | Jayakumar | G06F 17/5031 |
| 2016/0321390 A1* | 11/2016 | Bozman | G06F 17/505 |
| 2018/0131351 A1* | 5/2018 | Lee | G06F 17/505 |

OTHER PUBLICATIONS

Anonymous, "Method to perform timing driven placement to satisfy boundary timing contraints", IPCOM000235046D, Feb. 25, 2014, pp. 1-2.

Papa et al., "RUMBLE: An Incremental, Timing-driven, Physical-synthesis Optimization Algorithm", IEEE Transactions on Computer-Aided Design of Integrated Circuits and Systems, vol. 27, No. 12, Dec. 2008, pp. 2156-2168.

Alpert et al., "Techniques for Fast Physical Synthesis" Proceedings of the IEEE 95.3 (Apr. 2007) pp. 573-599.

Cho et al., "LatchPlanner: Latch Placement Algorithm for Datapath-oriented High-performance VLSI Designs" Proceedings of the International Conference on Computer-Aided Design. IEEE Press (Nov. 2013) pp. 342-348.

List of IBM Patents or Patent Applications Treated as Related; (Appendix P), Filed Sep. 12, 2019; 2 pages.

Musante et al., "Out-Of-Context Feedback Hierarchical Large Block Synthesis (HLBS) Optimization", U.S. Appl. No. 16/567,115, filed Sep. 11, 2019.

* cited by examiner

MEMORY ELEMENT GRAPH-BASED PLACEMENT IN INTEGRATED CIRCUIT DESIGN

BACKGROUND

The present invention relates to integrated circuit design, and more specifically, to memory element graph-based placement in integrated circuit design.

The process of creating an integrated circuit (IC), referred to as very large scale integration (VLSI) or chip design, includes many steps, some of which are repeated iteratively. Generally, combinational logic gates and memory elements (i.e., latches, flip-flops) are integrated into a process referred to as logic synthesis to implement the desired functionality of the IC. One of the results of the logic synthesis is a netlist that defines the connectivity among the various logic gates and memory elements that make up the IC. This logic synthesis is ultimately transitioned into a layout of physical components in an arrangement that considers the timing, congestion, and power usage constraints of the IC design. Processes that are performed iteratively as part of this transition from the logic design to the physical layout are referred to as physical synthesis. Physical synthesis includes placement (i.e., defining the location of cells), clock and timing optimization (i.e., ensuring that timing constraints are met based on the location of cells and the resulting wire lengths of interconnects), and routing (i.e., defining paths for the wires interconnecting cells). The goal of physical synthesis is to generate a layout that meets timing, congestion, and power metrics.

SUMMARY

Embodiments of the present invention are directed to systems and methods to perform physical synthesis to transition a logic design to a physical layout of an integrated circuit. A method according to an exemplary embodiment includes obtaining an initial netlist that indicates all components of the integrated circuit including memory elements and edges that interconnect the components. The method also includes generating a graph with at least one of the memory elements and the edges carrying one or more signals to the at least one of the memory elements or from the at least one of the memory elements. The components other than memory elements are not indicated individually on the graph. The netlist is updated based on the graph.

DETAILED DESCRIPTION

As previously noted, physical synthesis involves processes that transition a logical design of an IC to a physical layout of the components. One of the challenges of physical synthesis is the selection of metrics that will result in the optimal placement of those various components or cells. According to an exemplary embodiment of the invention, systems and methods are detailed herein to use the placement of memory elements as a proxy for optimal placement of the complete set of design components. A memory element graph, according to different embodiments of the invention, is generated and used in the placement and the clock and timing optimization processes. The integrated circuit design technology area and, subsequently, the resulting integrated circuit are improved based on the embodiments of the invention. This is because the use of the memory elements as a basis for the placement of other components has been found to provide better performance results (e.g., timing, density).

Figure 1:
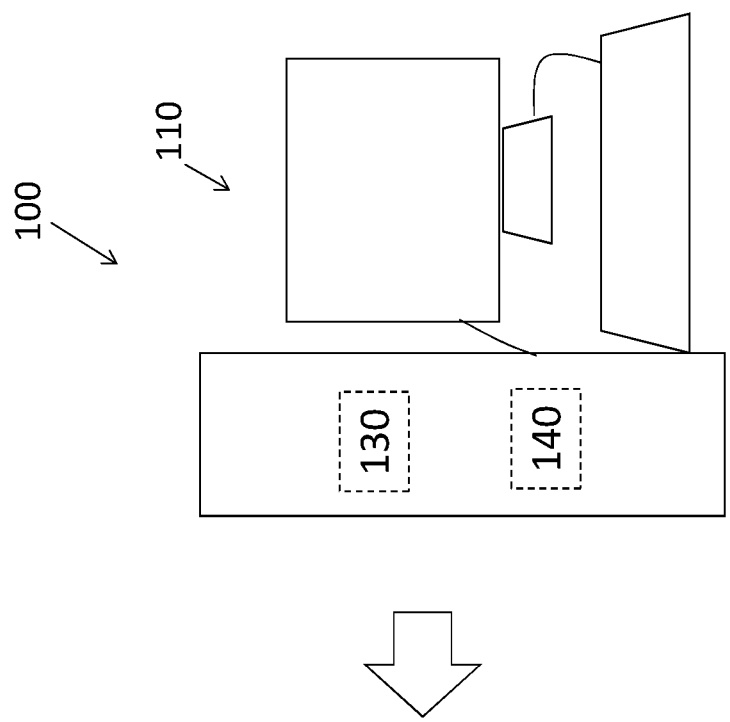
FIG. 1 is a block diagram of an integrated circuit design system according to embodiments of the invention.
Figure 1:
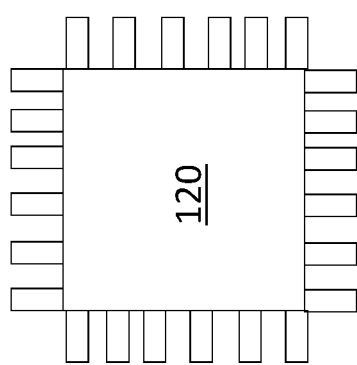

FIG. 1 is a block diagram of an integrated circuit design system 100 according to embodiments of the invention. The system 100 includes a processing system 110 used to design an integrated circuit and the resulting physical implementation of the IC or chip 120. The processing system 110 includes one or more memory devices 130 and one or more processors 140. The memory device 130 stores instructions implemented by the processor 140. As further discussed, these instructions include processes used to perform the placement and the clock and timing optimization functions that are part of finalizing the chip 120.

Figure 2:
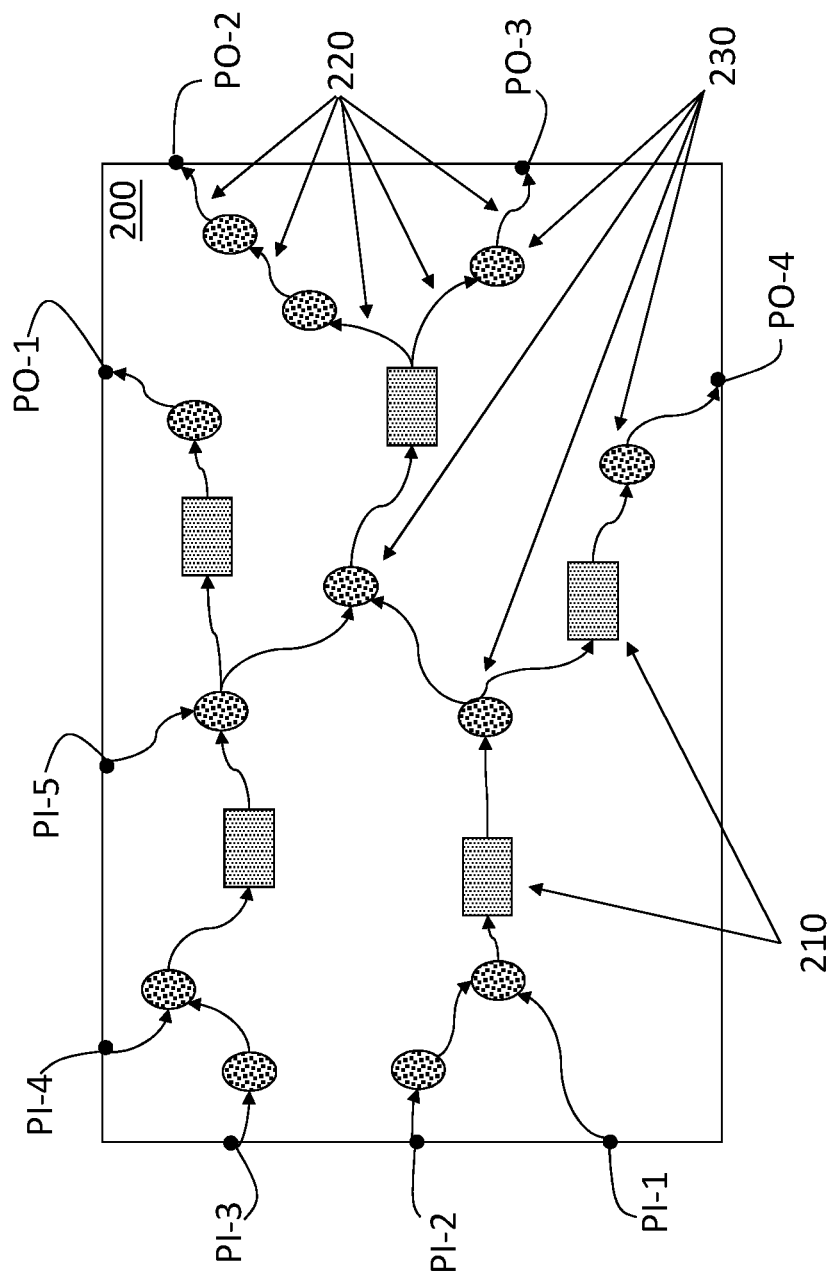
FIG. 2 is an exemplary memory element graph according to an embodiment of the invention.

FIG. 2 is an exemplary memory element graph 200 according to an embodiment of the invention. Exemplary primary inputs PI-1 through PI-5 (generally referred to as PI) and primary outputs PO-1 through PO-4 (generally referred to as PO) are shown at the perimeter of the memory element graph 200. Primary inputs PI are inputs that come into the chip 120 and drive the signals that traverse the chip 120, and primary outputs PO are outputs from the chip 120 that are provided outside the chip 120 rather than those used within the chip 120. Memory elements 210 and the edges 220 that represent wires that interconnect components are shown.

In the present embodiment, all non-memory element components (e.g., logic gates, buffers) in the chip 120 design are represented by nodes 230. A node 230 represents two or more components between memory elements 210. The significance of this representation is that the positions of these nodes 230 are reactive to the positions selected for the memory elements 210. That is, the memory elements 210 drive the placement process. This is further highlighted in the embodiment shown in FIG. 3.

Figure 3:
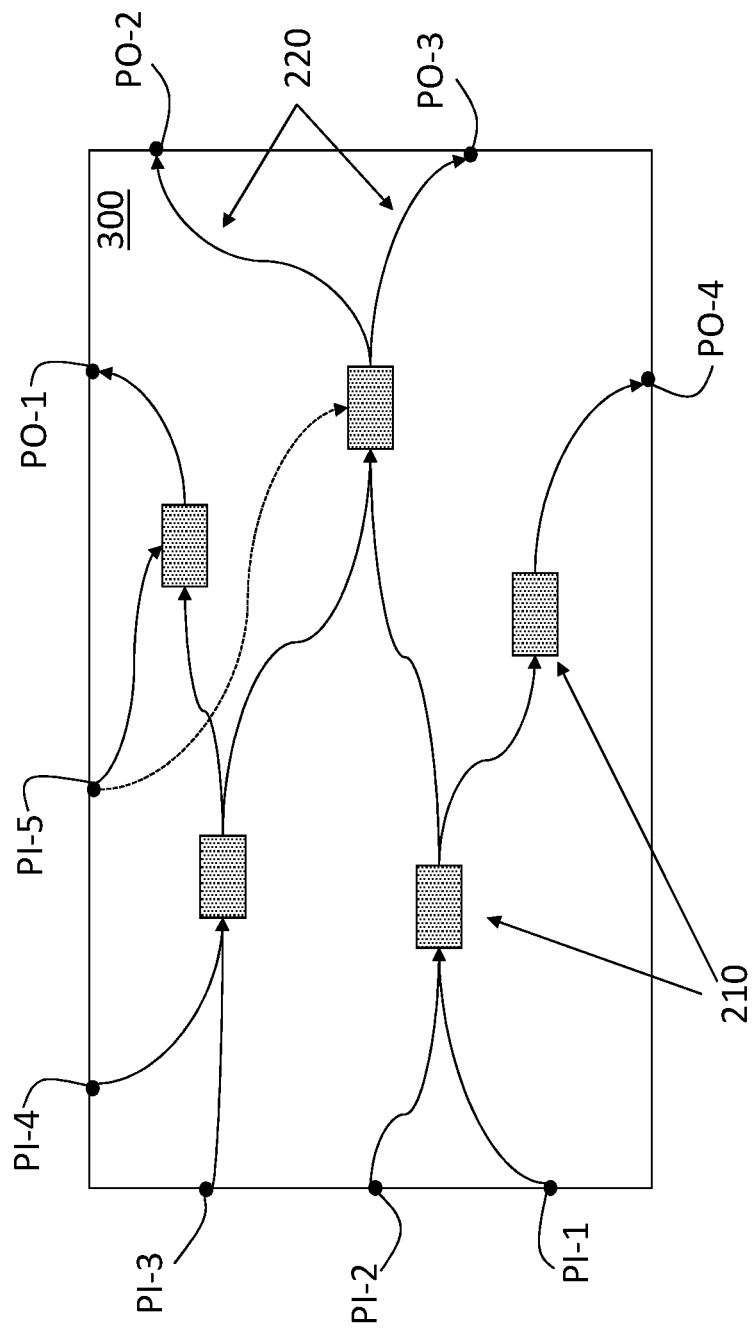
FIG. 3 is an exemplary memory element graph according to another embodiment of the invention.

FIG. 3 is an exemplary memory element graph 300 according to another embodiment of the invention. As in the embodiment shown in FIG. 2, the primary inputs PI and primary outputs PO are shown at the perimeter of the memory element graph 300. As in FIG. 2, the memory elements 210 and edges 220 are indicated between the primary inputs PI and primary outputs PO. Also as in FIG. 2, the edges 220 that represent wires are shown with arrows that indicate the direction of travel of the signal (i.e., which memory element 210 provides the signal and which memory element 210 receives the signal). According to the present embodiment, the nodes 230 that represent non-memory element components of the chip 120 are not shown at all. Instead, only the memory elements 210 are considered in the placement process.

Figure 4:
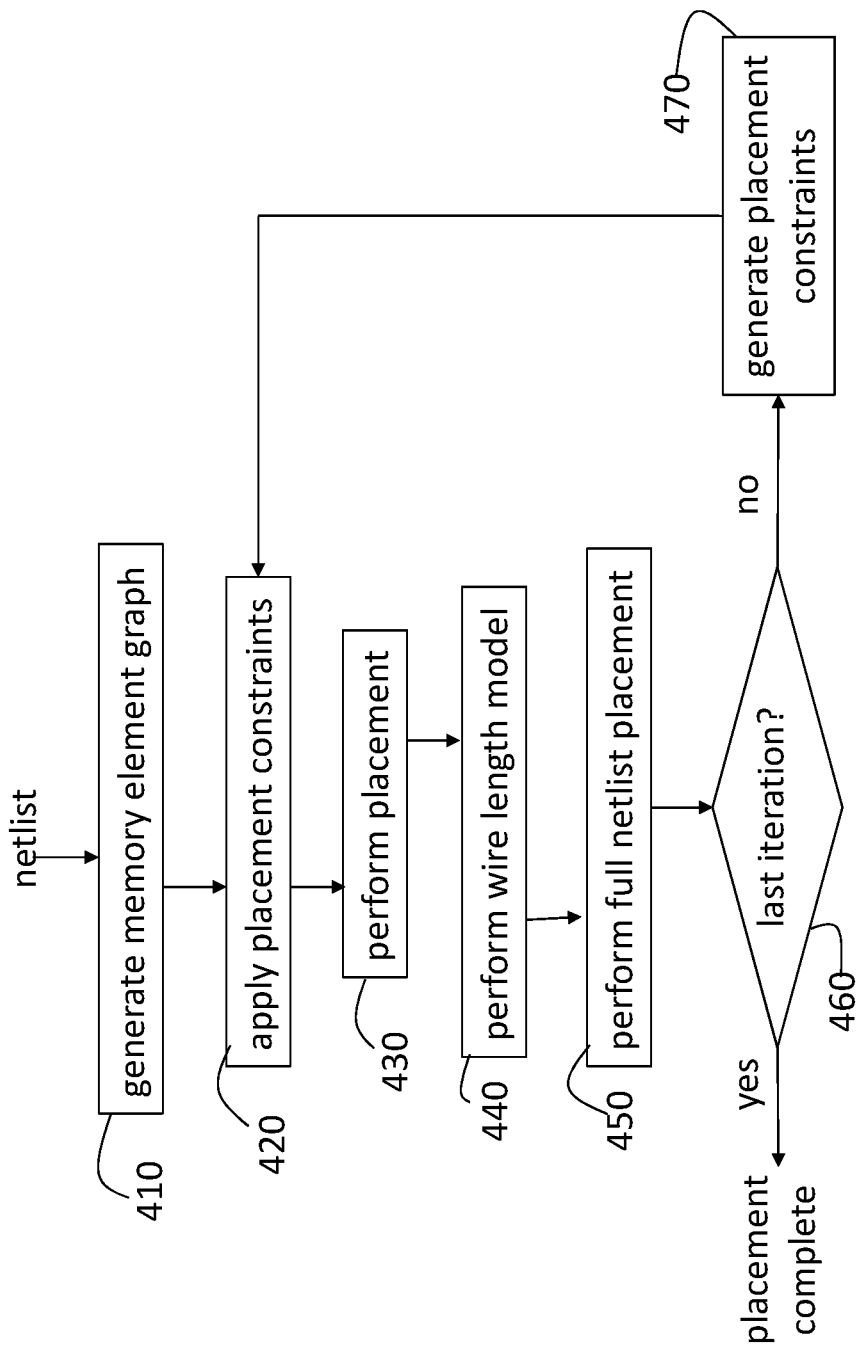
FIG. 4 is a process flow of a method of performing placement according to one or more embodiments of the invention.

FIG. 4 is a process flow of a method of performing placement according to one or more embodiments of the invention. As previously noted, placement is the process within physical synthesis that relates to placing the components at specific places on the chip 120. Thus, the components, according to the logic synthesis, are known prior to performing the physical synthesis. That is, an initial netlist is used in the placement process, as indicated. According to one or more embodiments of the invention, the placement process focuses on the memory elements 210 by using a memory element graph 200, 300. At block 410, generating a memory element graph 200, 300 begins the iterations that are performed to complete the placement process.

At block 420, applying placement constraints is further discussed for subsequent iterations because there are no placement constraints generated for the placement of memory elements 210 during the first iteration. Performing placement, at block 430, refers to using known analytical techniques but focusing only on the placement of the memory elements 210. Exemplary known analytical techniques numerically solve a cost function, where the solution is the placement of the memory elements 210. The cost function is based on balancing linear wire length, congestion, and timing. A part of the process of performing placement, at block 430, is the generation of soft constraints on the positions of the memory elements 210. These soft constraints provide historical context to the full netlist placement performed at block 450, as discussed further.

Performing wire-length modelling, at block 440, is also a known process (e.g., quadratic wire length modelling). Like the analytical techniques used to place the memory elements 210, at block 430, the wire-length modelling, at block 440, results in equations that can be solved. The solution determines the routing of the edges 220 that represent the wires in the memory element graphs 200, 300. At block 450, performing full netlist placement refers to performing placement (e.g., analytical placement techniques like those used at block 430) for all the components of the chip 120. As noted with reference to the placement process at block 430, the positions of the memory elements 210, determined at block 430, act as soft constraints during the placement of the other components at block 450.

Soft constraints do not preclude any movement of the memory elements 210 from the positions determined at block 430 but represent a weighting toward those positions. This weighting increases with each iteration. In a typical physical synthesis, this solution for the placement of all the components does not use any historical data. However, according to the embodiments of the invention, the placement of the memory elements 210 (the soft constraints) provides a historical basis for the placement of the other components. In the memory element graph 200 according to one embodiment, these other components are represented by the nodes 230, and in the memory element graph 300 according to another embodiment, these other components are not shown at all.

Processes at blocks 410 through 450 essentially generate a virtual netlist that involves only the memory elements 210. Each iteration that produces the placement, at block 450, is associated with a weighting of the placement of the memory elements 210. That is, as the number of iterations increases, the weighting increases such that changes in placement of the memory elements 210 are minimized and the physical synthesis begins to converge.

A check is done, at block 460, to determine whether the last iteration has been completed. The number of iterations may be a predefined value, for example. If all the iterations are completed, then the placement process is complete (i.e., the netlist generated at block 450 for the last iteration is the updated netlist) and clock and timing optimization, discussed with reference to FIG. 6, can be performed. If all the iterations are not completed, then generating placement constraints, at block 470, refers to using the position of the memory elements 210 that resulted from performing the full netlist placement, at block 450, as soft constraints for the next placement of the memory elements 210 alone, at block 430.

Like the soft constraints generated along with the placement of memory elements 210 at block 430, the soft constraints generated along with the placement of memory elements 210 along with other components, at block 450, involves a weighting that increases over the number of iterations. That is, the memory elements 210 are moved less and less over the iterations. At block 420, applying the placement constraints refers to using the position and weighting, at block 470, to give historical context to the next placement of the memory elements 210, at block 430. Again, this is similar to the way that the placement of memory elements 210, at block 430, provides soft constraints or historical context to the placement of memory elements 210 during full netlist placement, at block 450.

Figure 5:
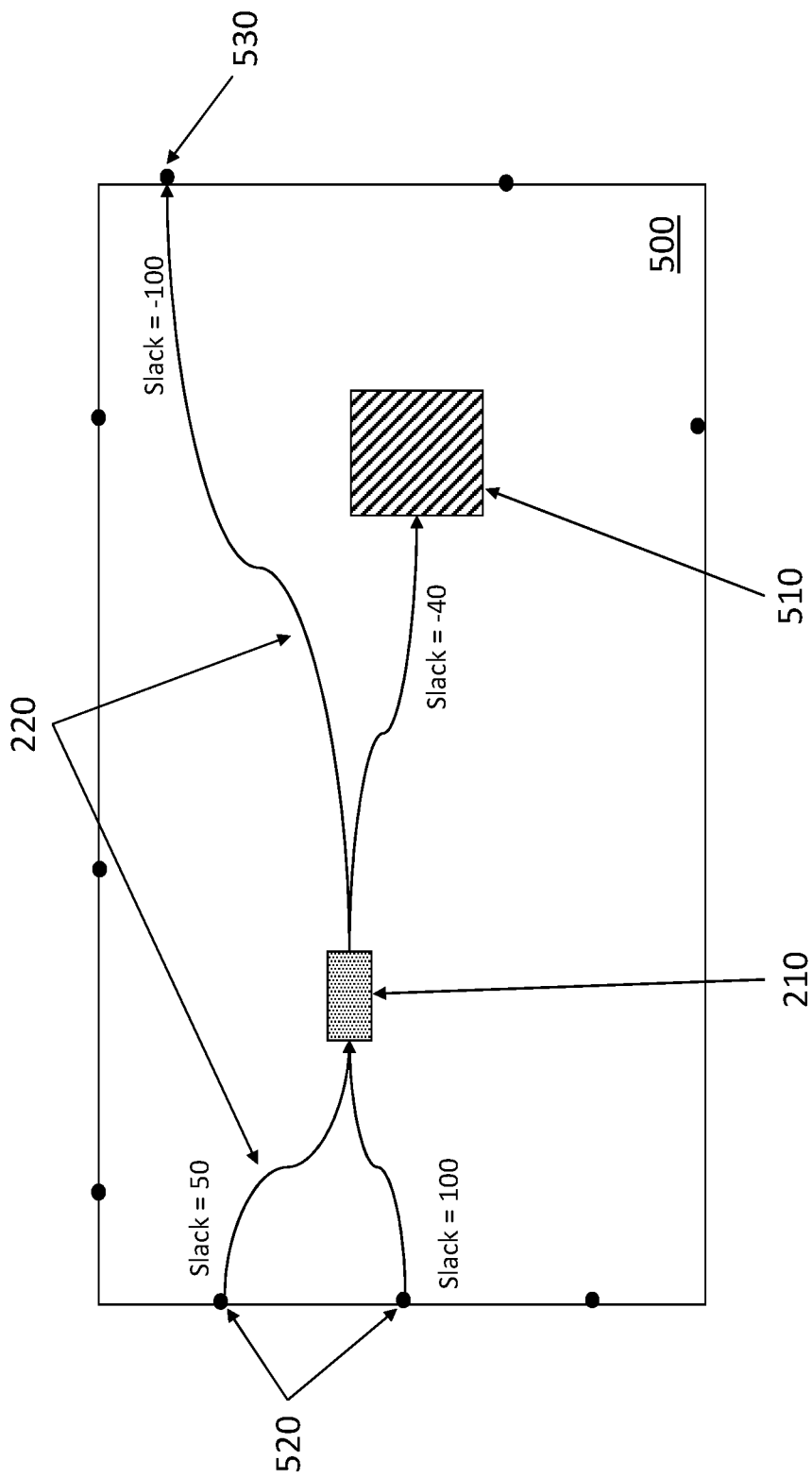
FIG. 5 is an exemplary single memory element graph according to an embodiment of the invention.

FIG. 5 is an exemplary single memory element graph 500 according to an embodiment of the invention. Once the full netlist placement is completed, at block 450, for the final iteration, the netlist is used to optimize clock and timing, at a next step in the physical synthesis process. Specifically, the timing of signals from one or more inputs 520 through the various components of the chip 120 to the primary outputs PO is determined. For each edge 220, the timing is based primarily on the length of the path that is traversed. For each edge 220, a slack value is recorded. The slack indicates the amount of timing variance from the timing requirement for that path. A positive slack value means that timing is faster than required. That is, even if that edge 220 had to be lengthened, timing can meet the requirement. A negative slack value means that the signal took longer to traverse the edge 220 than the allotted time according to the timing requirement.

According to one or more embodiments of the invention, the clock and timing optimization portion of the physical synthesis process uses a single memory element graph 500 like the one shown in FIG. 5. Specifically, based on the placement resulting from the processes discussed with reference to FIG. 4, timing is determined. Then, critical memory elements 210 are identified as those associated with edges 220 that miss the timing requirement (i.e., have a negative slack) by more than a threshold amount. As FIG. 5 shows, the single memory element graph 500 includes only one memory element 210, one or more edges 220 leading from inputs 520 to that memory element 210 and away from that memory element 210 to one or more outputs 530, and any fixed logic 510 that cannot be moved as a way to improve timing. An input can be a primary input PI or another component in a node 230, and an output 530 can be a primary output PO or another component in a node 230.

Figure 6:
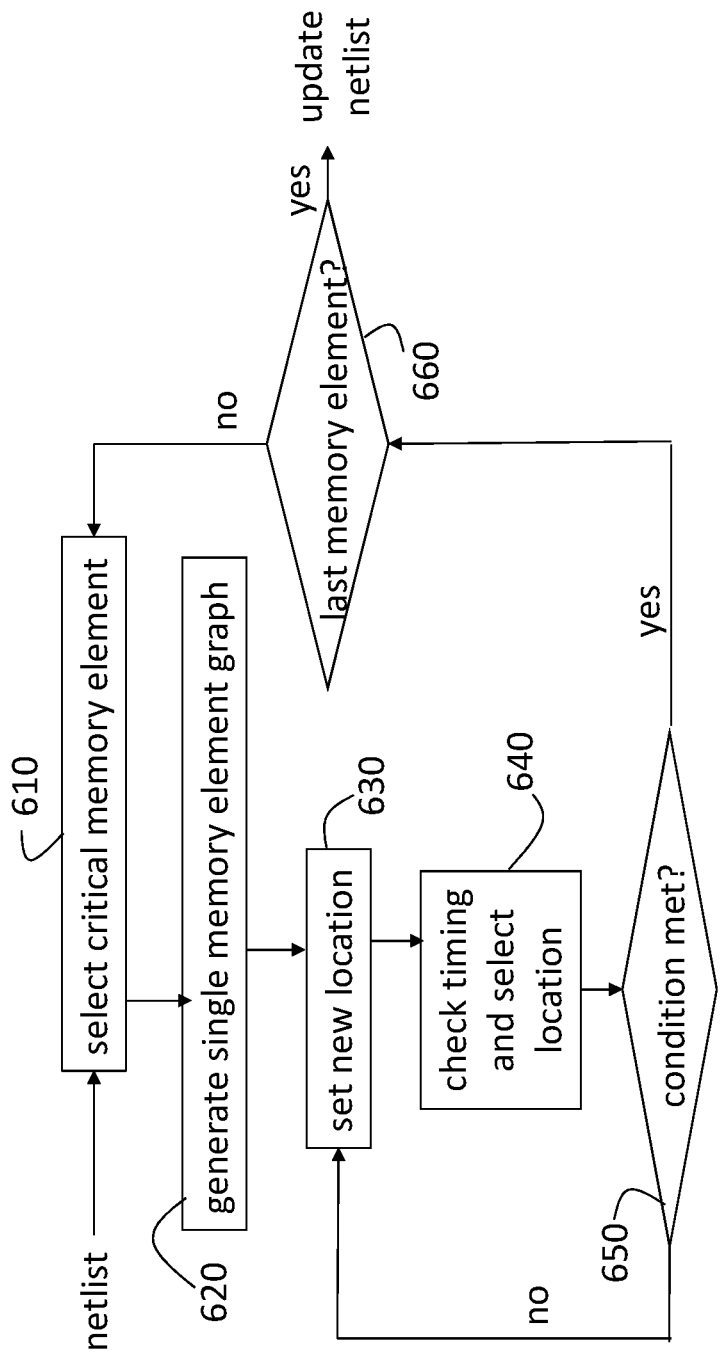
FIG. 6 is a process flow of a method of performing clock and timing optimization according to one or more embodiments of the invention.

FIG. 6 is a process flow of a method of performing clock and timing optimization according to one or more embodiments of the invention. As indicated by FIG. 6, the processes start, for example, with the netlist generated for the last iteration at block 450 (FIG. 4). Selecting a critical memory element 210, at block 610, is based on the delay calculated through each of the edges 220. The cumulative delays (i.e. arrival times) are compared with timing requirements, as noted with reference to FIG. 5, in order to compute timing slacks for each path. The determination of timing slacks is well known as part of static timing analysis.

Generating a single memory element graph 500, at block 620, refers to generating the graph like the one shown in FIG. 5 for the selected memory element 210. The slack is computed from a more detailed graph, such as the memory element graph 200 that includes nodes 230 shown in FIG. 2. During compression from the detailed graph (e.g., memory element graph 200) to the single memory element graph 500, the worst path slack is determined between any two points in the single memory element graph 500. This worst path slack is applied (using arrival timing assertions on the PIs and required time assertions on the POs) such that all inputs and outputs connected to the single memory element 210 have a starting slack which matches the slacks which would have been computed on those same points if the memory element graph 200 were not compressed. This process ensures that timing information is not lost in the transition from a memory element graph 200 to the single memory element graph 500.

In addition to matching slacks in the memory element graph 200 and single memory element graph 500, a model, referred to as a virtual delay model, is used to calculate a delay between two points (e.g., two memory elements 210) by using an average time of flight table for a representative buffer or inverter with a layer and wire code assignment in any given technology for a unit of distance. This delay model allows for the slack of the single memory element 210 in the single memory element graph 500 to be recalculated upon incremental movements of the memory element 210, as required, such that slack improvement can be evaluated. Processes at blocks 630 and 640 are performed iteratively, as needed, to improve the timing.

Setting the new location, at block 630, is performed differently for the first iteration than for subsequent iterations. For the first iteration, given the initial location for the selected memory element 210, a new location is determined such that the worst slack value of the objects connected to the selected memory element 210 can be maximized. The new location can be calculated via timing-driven linear programming optimization or other analytical method. According to an exemplary embodiment, a linear-delay based diamond shape is used to place the selected memory element 210. With a given netlist and initial placement, the slack of every object in the single memory element graph 500 is known, and the distance between the selected memory element 210 and each object connected to it is known. A linear delay model enables building a Manhattan distance-based diamond shape so that the selected memory element 210 satisfies certain target delay.

For a given netlist and initial placement, the best possible slack SLK' of each object can be calculated (i.e., the slack when the selected memory element 210 is placed right next to each object). For each pair of connected objects of the selected memory element 210, a set of locations can be calculated such that the selected memory element 210 maximizes the slacks of the pair of connected objects. Visually, this is the line segment abutting two diamond shapes of objects. The corresponding target slack is called critical slack CS of these two connected objects. The critical slacks of all the pairs of connected objects can be calculated. The minimum critical slack among all the pairs of critical slacks and the corresponding line segment of diamond shapes is the new location of the selected memory element 210 that maximizes the slack of all the connected objects. The existence of such critical slack and line segment can be proved mathematically. This location, determined at block 630 for the first iteration, forms a starting point for further processing during the subsequent iterations.

At block 640, checking timing and selecting a location for the selected memory element 210 refers to determining if slack values in the single memory element graph 500 are improved based on the location set at block 630. Setting the location of the selected memory element 210 as part of the processing at block 640 means that the new location (set at block 630) is not necessarily maintained. Instead, the location of the selected memory element 210 that provides the best slack values is maintained as the current location of the selected memory element 210. While this location can be the previously set location (at block 630), it can, instead, be the location of the memory element 210 prior to the most recent processing at block 630. At block 650, a check is done of whether any one of three conditions, which are detailed below, has been met to end the iterations to place the selected memory element 210. If not, setting the new location, at block 630, for the next iteration refers to perturbing the location set at block 640 (i.e., the location that provided the best slack values among the locations tested thus far).

That is, at block 630, the location set at block 640 is perturbed in the north, south, east, west, northeast, northwest, southeast, or southwest direction to set the new location. The effect of the new location on timing is determined, at block 640. Thus, for example, if perturbation in a particular direction from a starting location did not improve timing (as determined at block 640), then a perturbation in another direction from the same starting location is made, at block 630. The perturbation in another direction from the same starting location is possible because, based on the check of timing at block 640, the perturbation in the first direction (which did not yield improved timing) will not be retained. Instead, at block 640, the location from which the perturbation in the first direction was made will be the starting location for the next perturbation performed at block 630. Because overlaps can occur in the setting of new locations, previously set locations can be tracked to avoid repeating an iteration.

The three conditions that are checked at block 650 are: (1) whether a preset limit for iterations is reached, (2) whether perturbations in every direction from a given starting location has been checked with no further improvement in timing, and (3) whether a target slack value has been achieved (i.e. the selected memory element 210 is no longer considered critical). If any of the three conditions is met, as checked at block 650, then the last location set at block 640 (i.e., the location for the selected memory element 210 that yielded the best slack values) is saved, and the flow proceeds to block 660. A check is done, at block 660, of whether all critical memory elements 210 have been addressed. If not, another memory element 210 is selected at block 610. If all critical memory elements 210 have been selected, then the netlist is updated based on the new locations saved for each of the critical memory elements 210. The updated netlist indicates the placement of components in the subsequent manufacture of the physical implementation of the chip 120. According to an exemplary embodiment, the new location of each of the memory elements 210 can be updated all at once after all the critical memory elements 210 have been processed according to the flow shown in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of performing physical synthesis to transition a logic design to a physical layout of an integrated circuit, the method comprising:
   obtaining, using a processor, an initial netlist that indicates all components of the integrated circuit including memory elements and edges that interconnect the components;
   generating a graph, using the processor, with at least one of the memory elements and the edges carrying one or more signals to the at least one of the memory elements or from the at least one of the memory elements, wherein components other than memory elements are eliminated from the graph or are combined for inclusion on the graph;
   performing wire-length modelling to determine routes of the edges in the graph; and
   updating the netlist, using the processor, based on the graph, wherein the generating the graph includes representing only one memory element and the edges associated with the only one memory element, at least one of the edges associated with the only one memory element having a slack value below a threshold value, the slack value indicating a result of subtracting a time delay for the at least one of the edges from a required time delay for the at least one of the edges.

2. The method according to claim 1, wherein the generating the graph includes representing all the memory elements in the graph.

3. The method according to claim 2, wherein the generating the graph includes representing two or more of the components other than the memory elements together as nodes in the graph.

4. The method according to claim 2, further comprising determining a changed placement for one or more of the memory elements in the graph iteratively for a specified set of iterations.

5. The method according to claim 4, further comprising generating an interim netlist with all the components based on the changed placement for the one or more of the memory elements, wherein the updating the netlist includes adopting the interim netlist for a last iteration among the specified set of iterations.

6. The method according to claim 1, further comprising moving the only one memory element iteratively to a new location until the slack values of all of the edges associated with the only one memory element exceed the threshold value.

7. The method according to claim 6, wherein the updating the netlist includes adopting the new location of the only one memory element.

8. A system to perform physical synthesis to transition a logic design to a physical layout of an integrated circuit, the system comprising:
   a memory device configured to store an initial netlist that indicates all components of the integrated circuit including memory elements and edges that interconnect the components; and
   a processor configured to generate a graph with at least one of the memory elements and the edges carrying one or more signals to the at least one of the memory elements or from the at least one of the memory elements, wherein components other than memory elements are eliminated from the graph or are combined for inclusion the graph, to perform wire-length modelling to determine routes of the edges in the graph, and to update the netlist based on the graph, wherein the graph includes a representation of only one memory element and the edges associated with the only one memory element, at least one of the edges associated with the only one memory element having a slack value below a threshold value, the slack value indicating a result of subtracting a time delay for the at least one of the edges from a required time delay for the at least one of the edges.

9. The system according to claim 8, wherein the graph includes a representation of all the memory elements in the graph.

10. The system according to claim 9, wherein the graph includes a representation of two or more of the components other than the memory elements together as nodes in the graph.

11. The system according to claim 9, wherein the processor is further configured to determine a changed placement for one or more of the memory elements in the graph iteratively for a specified set of iterations, to generate an interim netlist with all the components based on the changed placement for the one or more of the memory elements, and to update the netlist by adopting the interim netlist for a last iteration among the specified set of iterations.

12. The system according to claim 8, wherein the processor is further configured to move the only one memory element iteratively to a new location until the slack values of all of the edges associated with the only one memory element exceed the threshold value and to update the netlist by adopting the new location of the only one memory element.

13. A computer program product for performing physical synthesis to transition a logic design to a physical layout of an integrated circuit, the computer program product comprising a computer readable storage medium having program instructions embodied therewith, the program instructions executable by a processor to perform a method comprising:
   obtaining an initial netlist that indicates all components of the integrated circuit including memory elements and edges that interconnect the components;
   generating a graph with at least one of the memory elements and the edges carrying one or more signals to the at least one of the memory elements or from the at least one of the memory elements, wherein components other than memory elements are eliminated from the graph or are combined for inclusion on the graph;
   performing wire-length modelling to determine routes of the edges in the graph; and
   updating the netlist based on the graph, wherein the generating the graph includes representing only one memory element and the edges associated with the only one memory element, at least one of the edges associated with the only one memory element having a slack value below a threshold value, the slack value indicating a result of subtracting a time delay for the at least one of the edges from a required time delay for the at least one of the edges.

14. The computer program product according to claim 13, wherein the generating the graph includes representing all the memory elements in the graph.

15. The computer program product according to claim 14, wherein the generating the graph includes representing two or more of the components other than the memory elements together as nodes in the graph.

16. The computer program product according to claim 14, further comprising determining a changed placement for one or more of the memory elements in the graph iteratively for a specified set of iterations and generating an interim netlist with all the components based on the changed placement for the one or more of the memory elements, wherein the updating the netlist includes adopting the interim netlist for a last iteration among the specified set of iterations.

17. The computer program product according to claim 13, further comprising moving the only one memory element iteratively to a new location until the slack values of all of the edges associated with the only one memory element exceed the threshold value, wherein the updating the netlist includes adopting the new location of the only one memory element.

\* \* \* \* \*